Figure 1:
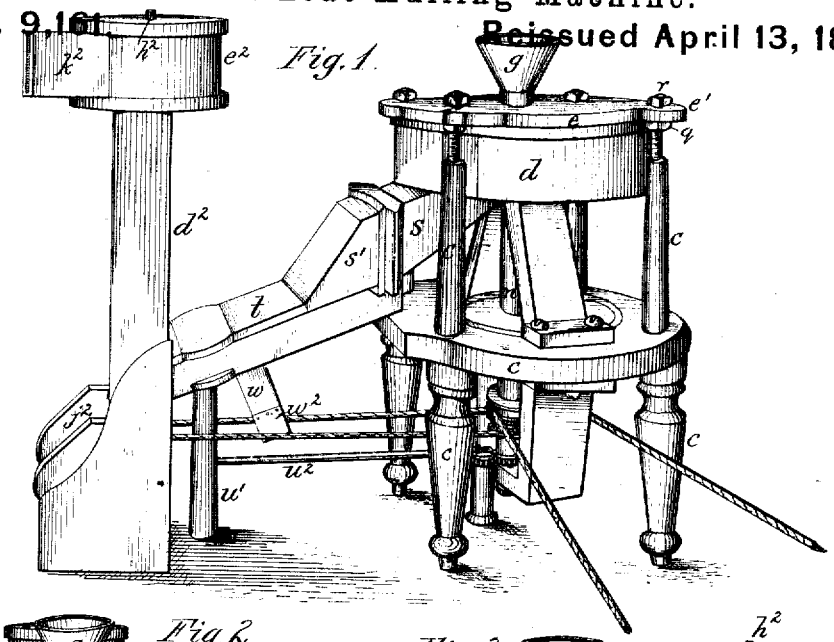

2 Sheets—Sheet 1.

T. NELSON, dec'd.,

Assignor, by mesne Assignments, to E. WILHELM.

Buckwheat-Hulling Machine.

No. 9,161. Reissued April 13, 1880.

Chas. J. Buchheit
Edw. J. Brady
Witnesses.

Edward Wilhelm
Assignee of Thomas Nelson
By Wilhelm & Bonner
Attorneys.

N. PETERS, PHOTO-LITHOGRAPHER, WASHINGTON, D. C.

T. NELSON, dec'd.,
Assignor, by mesne Assignments, to E. WILHELM.
Buckwheat-Hulling Machine.
No. 9,161. Reissued April 13, 1880.
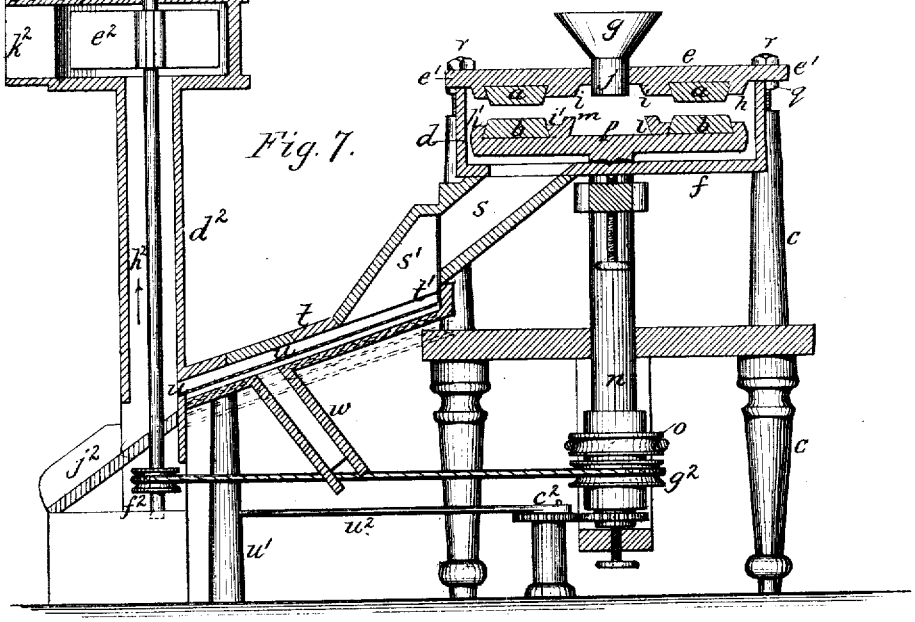
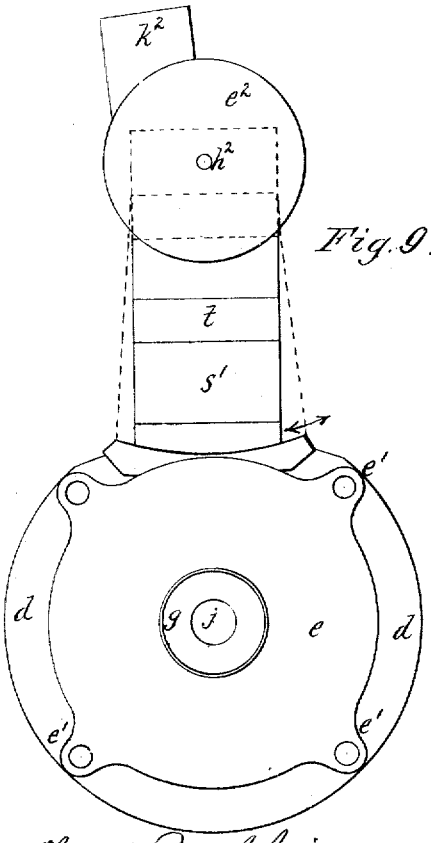
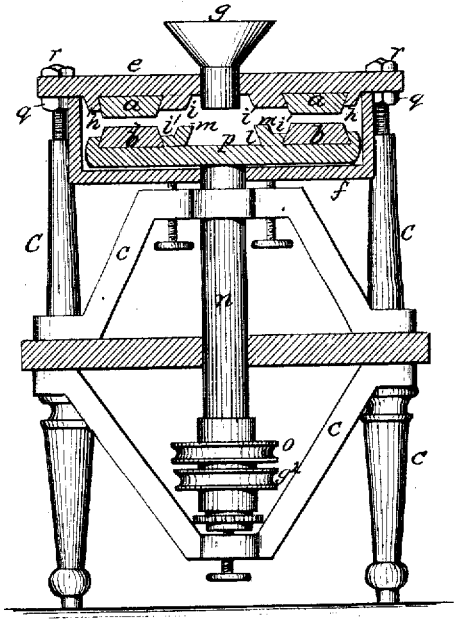
Chas. J. Buchheit
Edw. J. Brady } Witnesses.
Edward Wilhelm Assignee of
Thomas Nelson.
By Wilhelm & Bonner Attys.
N. PETERS, PHOTO-LITHOGRAPHER, WASHINGTON, D. C.

UNITED STATES PATENT OFFICE.

EDWARD WILHELM, OF BUFFALO, NEW YORK, ASSIGNEE, BY MESNE ASSIGNMENTS, OF THOMAS NELSON, DECEASED.

BUCKWHEAT-HULLING MACHINE.

SPECIFICATION forming part of Reissued Letters Patent No. 9,161, dated April 13, 1880.

Original No. 100,790, dated March 15, 1870; antedated March 3, 1870. Application for reissue filed December 29, 1879.

*To all whom it may concern:*

Be it known that THOMAS NELSON, late of the city of Troy, in the county of Rensselaer and State of New York, did invent certain new and useful Improvements in Machines for Hulling Buckwheat, of which the following is a full, clear, and exact description, reference being had to the accompanying drawings.

This invention relates to a machine for hulling the buckwheat preparatory to grinding the same into flour by detaching and separating the hulls or shucks and skins from the meats.

The object of the invention is the construction of a machine by which this operation is carried out expeditiously and economically; and it consists, in a buckwheat-hulling machine, in the combination, with a suitable hulling mechanism arranged in a tight case, the surrounding sides of which are cut off from any connection with the suction, and a suction air-trunk, whereby the light offal is separated from the heavier pieces of meats, of one or more sieves arranged in a suitable case and interposed between the hulling mechanism and the suction air-trunk, whereby the flour and fine broken particles of meats are separated from the hulled material and collected previous to subjecting this material to the action of the suction air-trunk, as will be hereinafter more fully and in detail explained; also, in combining with the hulling mechanism arranged in the close case (the sides of which are cut off from any communication with the suction) one or more shaking-screens arranged in a case provided with a flour-spout located at a point outside the influence of the suction, and a suction air-trunk connected with the tail end of the screen or screens, substantially as and for the purposes hereinafter explained; also, in the peculiar construction of the oscillating screen and the stationary discharge-spout of the hulling mechanism, whereby the receiving end of the screen adjoining the stationary discharge-spout is given a free oscillating motion; also, of various details of construction, as will be hereinafter fully set forth.

Figure 2:
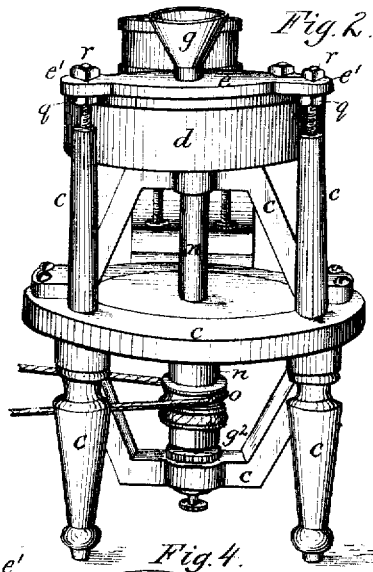
Figure 3:
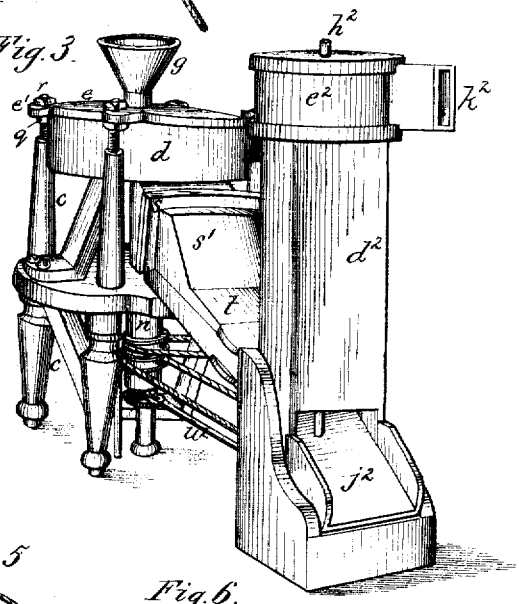
Figure 4:
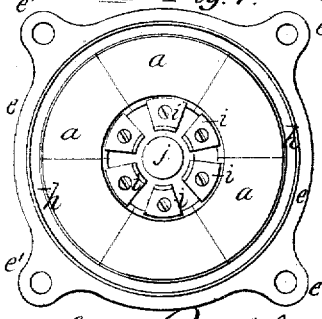
Figure 5:
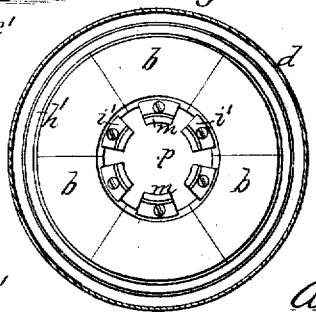
Figure 6:
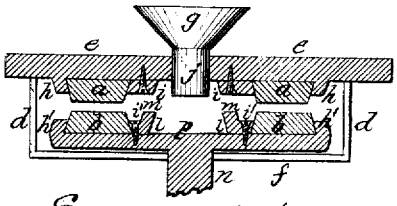

In the accompanying drawings, consisting of two sheets, Figure 1 represents a perspective view from the driving side of the machine. Fig. 2 represents a perspective view from the receiving end. Fig. 3 represents a perspective view from the opposite or discharging end. Fig. 4 represents a horizontal view of the upper stone. Fig. 5 represents a horizontal view of the under stone. Fig. 6 represents a vertical section of the stones and their connection with the machine-frame, &c. Fig. 7 represents a vertical longitudinal section. Fig. 8 represents a vertical transverse section. Fig. 9 represents a top-plan view of the machine.

Like letters of reference refer to similar parts in the several figures.

*a* represents the upper hulling-stone. *b* represents the under stone. *c* represents the frame-work supporting the plates, stones, &c. This frame-work may be made of wood or iron, and constructed in any suitable manner for the purpose, which is to support and sustain the driving and principal working parts of the machine.

*d* represents the curb or casing surrounding and inclosing the stones *a* and *b*, thus forming a chamber, within which the operation of hulling is performed. *e* represents the covering-plate over this chamber, and *f* represents the bottom of this said chamber.

The upper stone, *a*, is securely fastened to the plate *e*, and remains stationary. In the center of the plate *e* there is an eye or aperture, *j*, through which the spout of the hopper *g* is passed downward in the usual way. The stone *a* is constructed as shown in Fig. 4, and so arranged that a section may be easily removed and another set in its place. Stones sometimes become glazed, cracked, or otherwise imperfect, when it may be convenient to replace them. Another advantage to be derived from this mode of construction is that all liability of a stone bursting is done away with, and any kind of stone or composition may be used which may be suited to the purpose. These sections are secured to the plate *e*, as shown in Fig. 4, on the outer edge by the flange *h*, which covers the edge of the stone sufficiently to hold it there, and on the inner edge by the circular segmental plates marked *i*, which also cover the edge of the stones sufficiently to hold them in place.

These plates $i$ are usually constructed of cast-iron; but any suitable material will answer.

The operation of placing the sections of stones is as follows: The outer edge is slid under the flange $h$ and the stone is placed flat to the plate $e$, embedded in the cement, and after the sections are all thus placed the set-plates $i$ are placed in position, as shown in Figs. 7 and 8, and bolted, screwed, or otherwise secured to the plate $e$. The under stone, $b$, is constructed in sections precisely similar, and secured to a circular plate, shown at $p$, Figs. 6, 7, and 8, the outer edge of the same having a flange, $h'$, covering the lower edge of the stone, and there are also set-plates, in shape corresponding with the stone, as shown at $i'$, Figs. 4 and 5, which overlap the inner lower edge or corner of the stone.

Underneath the hopper $g$ there is a depression formed between the inner circle of the set-plates $i'$, and shown at $l$, Figs. 4, 5, 6, 7, and 8, and the inner edge of the set-plates forms a flange surrounding this depression, as shown at $m$, constructed so that the upper and inner edge forms an acute angle, slightly overlapping this depression, for the purpose of catching, holding, and otherwise preventing large stones and other hard substances from passing between the stones $a$ and $b$. The working-faces of the stones are raised beyond the surface of the flanges $h$ and $h'$, also the set-plates $i$ and $i'$, as shown in Figs. 6, 7, and 8, so that they may wear away considerably before it becomes necessary to remove them, the iron plates outlasting a great number of stones.

It will be obvious that by constructing and securing the stones in the manner above described they may be made very thin.

The circular plate $p$, which holds the stone $b$, is secured to the end of the shaft $n$, and to this shaft motion is applied at the pulley $o$, which causes the stone $b$ to revolve.

The upper plate, $e$, is attached to the standards $c$, as shown, a screw passing upward through the ear $e'$ of the plate, a nut underneath, marked $q$, and another above, marked $r$, each corner the same; and by means of this arrangement the plate $e$ is held in place.

At a suitable place there is a discharging-spout leading from the chamber containing the stones, as shown at $s$, and having a proper descent to the receiving-spout, marked $t$, which leads therefrom downward at a proper angle from the discharging-spout $s$, and contains a sieve—or it may be a series of sieves—constructed of wire; or they may be made of thin metal, perforated in any suitable manner. The sieve is shown at $u$. The dotted lines show a series of sieves.

The spout $t$ is completely inclosed, except at the ends and at the place marked $t'$. At the place marked $w$ there is another spout, leading downward at a proper angle as an outlet for the finer portions and broken kernels of the buckwheat which have passed through the meshes of the sieve.

To the receiving end of the spout $t$, containing the sieve $u$, or series of sieves, motion is applied by means of the standard $u'$ and the rod $u^2$. The motion is shown by the dotted lines and arrows in Fig. 9, and is of an oscillating nature. The rod $u^2$ is attached to an eccentric or its equivalent at $c^2$, geared to the shaft $n$, as shown.

By placing the standard $u'$ at the position and point shown it will be seen that the motion of the spout is considerable at its receiving end and but slight at its discharging end.

The object of having a series of sieves would be principally to separate the different degrees of fineness.

At the receiving end of the spout $t$ there is an inclosure, reaching up and covering the opening on the top and sides. This inclosure is marked $s'$, and is intended to be of a size sufficient to cover the outlet of the spout $s$ when the oscillating motion of the spout $t$ is in progress, the faces where they join having sufficient curve to admit of the motion, as mentioned.

Adjoining the discharge end of the spout $t$ there is a vertical air-trunk, $d^2$, connecting at its upper end with the eye of a rotary fan, $e^2$. The latter is mounted on a vertical shaft, $h^2$, which extends downward through the bottom of the air-trunk $d^2$, and carries at its lower end a pulley, $f^2$, to which motion is applied by means of an endless belt from a pulley, $g^2$, on the shaft $n$.

By the rotation of the fan $e^2$ within its case a current of air is caused to pass upward through the air-trunk $d^2$. The tail end of the spout $t$, containing the sieve $u$, discharges into the air-trunk $d^2$, and there is an outlet, $j^2$, from the trunk $d^2$, through which the larger fragments of meats and unhulled kernels escape, and through which the air enters the trunk $d^2$. The current of air rising within the trunk $d^2$ draws thereto from the spout $t$ all the lighter matter, such as hulls, dust, &c., which are drawn out and upward through the trunk $d^2$ to the fan $e^2$, and from thence are blown out through the discharge-spout $k^2$.

The spout $w$ may have leather flaps or gills on each side, (shown at $w^2$, Fig. 1,) which close when the draft from the fan is too strong.

The operation of the machine is as follows: The buckwheat admitted through the hopper $g$ is distributed by centrifugal force between the stones $a$ $b$, and the hulls and skins are detached from the meats, and the latter are to a greater or less extent broken up by the operation of the stones. The hulled material is discharged from the stones through the spout $s$ and received upon the sieve $u$, while the coarser particles and unhulled kernels pass over the tail of the sieve $u$ and are discharged into the air-trunk $d^2$. The dust and other light offal—such as fragments of hulls and skins—are carried off by the air-current and drawn to the fan, while the large fragments of meats and unhulled kernels are discharged from the air-trunk through the opening $j^2$ at its bottom.

The object of the sieve $u$ is to remove the lighter and cracked parts of kernels from the action or draft of the fan, which might be strong enough to carry them off were they permitted to pass far enough within its reach.

Having thus described the construction and operation of the said invention of THOMAS NELSON, what is claimed, and desired to be secured by Letters Patent, is—

1. In a buckwheat-hulling machine, the combination, with a suitable hulling mechanism arranged in a tight case, the surrounding sides of which are cut off from any connection with the suction, and a suction air-trunk, whereby the light offal is separated from the heavier pieces of meats, of one or more series arranged in a suitable case and interposed between the hulling mechanism and the suction air-trunk, whereby the flour and fine broken particles of meats are separated from the hulled material and collected previous to subjecting this material to the action of the suction air-trunk, substantially as and for the purpose set forth.

2. The combination, with the hulling mechanism *a b*, arranged in a tight case, the surrounding sides of which are cut off from any connection with the suction, of one or more shaking-screens, *u*, receiving the hulled grain from the hulling mechanism, and arranged in a case, *s'*, provided with flour-spout *w* away from the influence of the suction, and the suction air-trunk $d^2$, connected with the tail end of the screen *u*, substantially as and for the purpose set forth.

3. The combination of the hulling-stones *a* and *b* and the stationary discharging-spout *s* therefrom with the spout *s' t*, constructed and provided with the vibrating standard or shaft *w'*, its operating-rod $u^2$, and operating-wheel $c^2$, receiving motion from the shaft *n*, or their equivalent operating parts, so as to oscillate the receiving end of said spout *s' t*, substantially as hereinbefore described.

4. The combination, with the hulling-stones *a* and *b*, of the stationary discharging-spout *s*, the spout *s' t*, oscillating at its end next the spout *s*, as described, its sieves *u*, the vertical spout $d^2$, and the exhaust-fan $e^2$, all substantially as and for the purpose described.

5. The combination, with the stationary discharge-spout *s*, constructed with a concave end, of the oscillating receiving-spout *s' t*, having a convex end, substantially as and for the purpose described.

EDWARD WILHELM,
*Assignee of Thomas Nelson.*

Witnesses:
JNO. J. BONNER,
CHAS. J. BUCHHEIT.

Correction in Reissue Letters Patent No. 9,161.

It is hereby certified that the word "series," occurring in the 15th line, 3d page of the printed specification of these Letters Patent should be *seives*, to agree with the original specification as allowed and on file in this Office.

April 23, 1880.